United States Patent [19]

Borsuk

[11] 4,447,120
[45] May 8, 1984

[54] FIBER OPTIC CABLE CLAMP

[75] Inventor: Leslie M. Borsuk, Los Alamitos, Calif.

[73] Assignee: International Telephone & Telegraph Corporation, New York, N.Y.

[21] Appl. No.: 308,518

[22] Filed: Oct. 5, 1981

[51] Int. Cl.³ .............................................. G02B 7/26
[52] U.S. Cl. ................................ 350/96.20; 350/96.23
[58] Field of Search ............... 350/96.20, 96.21, 96.23; 174/70 R, 84 C

[56] References Cited

U.S. PATENT DOCUMENTS

| | | | |
|---|---|---|---|
| 3,655,275 | 4/1972 | Seagreaves | 350/96.20 X |
| 3,982,060 | 9/1976 | Avery et al. | 350/96.20 X |
| 4,047,797 | 9/1977 | Arnold et al. | 350/96.21 |
| 4,252,406 | 2/1981 | Ryan, Jr. et al. | 350/96.21 |
| 4,283,125 | 8/1981 | Borsuk | 350/96.20 |
| 4,319,802 | 3/1982 | Bowes | 350/96.20 |
| 4,336,977 | 6/1982 | Monaghan et al. | 350/96.20 |

FOREIGN PATENT DOCUMENTS 2057780  4/1981  United Kingdom ............ 350/96.20

Primary Examiner—John D. Lee
Attorney, Agent, or Firm—T. E. Kristofferson; T. L. Peterson

[57] ABSTRACT

A clamp is disclosed for a fiber optic cable having metal strength members. The strength members are fed through axial slots in the forward end of an inner sleeve of the clamp and are wound helically around the inner sleeve. Thereafter an outer sleeve is crimped around the helically wound portions of the strength members and the inner sleeve to tightly secure the strength members to the sleeve.

15 Claims, 6 Drawing Figures

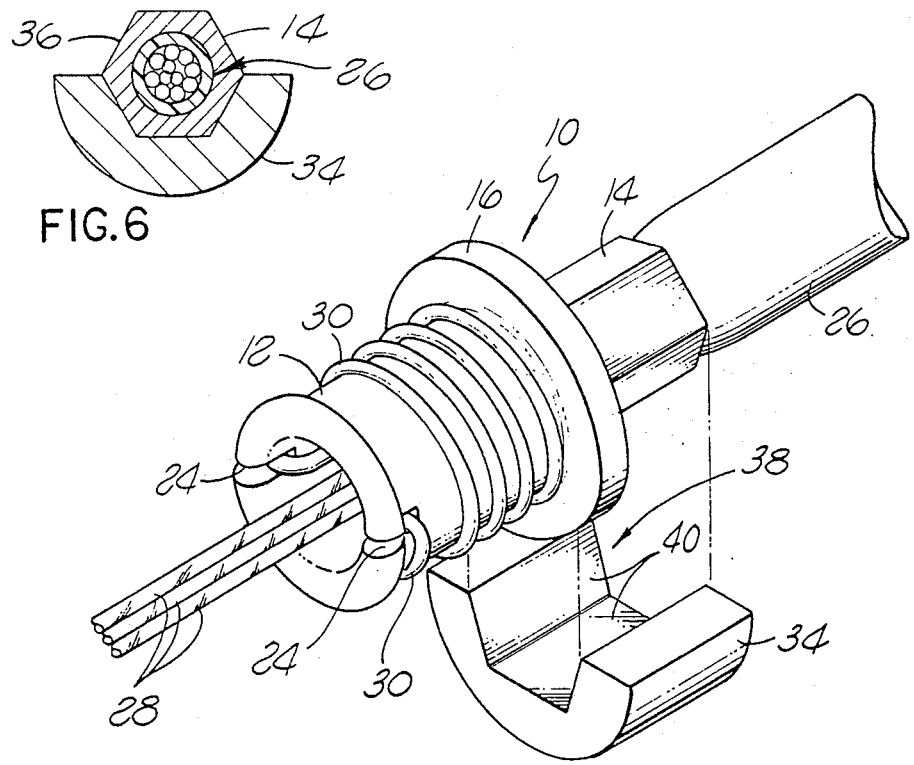
FIG. 6
FIG. 4
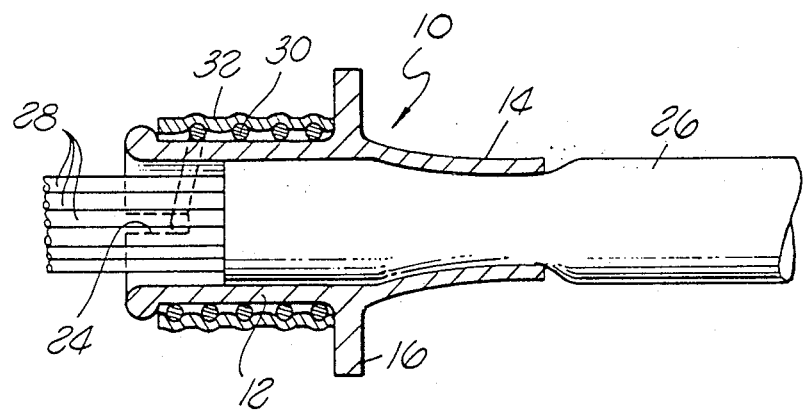
FIG. 5

FIBER OPTIC CABLE CLAMP

BACKGROUND OF THE INVENTION

The present invention relates generally to a cable clamp and, more particularly, to a clamp for use in a fiber optic connector to tightly secure the strength members of a fiber optic cable connected to the connector.

It is common practice to terminate the strength members of a fiber optic cable by trapping them between two concentrically fitting press-fit sleeves. The termination is physically accomplished by placing the cable inside the inner sleeve and folding the strength members, typically plastic strands, back over the inner sleeve. The outer sleeve is then press-fit over the inner sleeve to trap the strands. Such a termination arrangement is disclosed in U.S. Pat. No. 4,047,797, to Arnold et al. Such an arrangement is not suitable for making a high friction clamp to a fiber optic cable having wire strength members.

A clamp which has been used for cables having wire strength members includes an inner sleeve having an outwardly extending annular flange at its forward end providing a rearwardly facing shoulder. The inner sleeve is threaded on its outer surface behind the shoulder. The wire strength members of the cable are folded back over the flange into engagement with the rearwardly facing shoulder. A nut is then threaded forwardly over the inner sleeve so that its forward edge butts against the rearwardly facing shoulder of the flange thereby clamping the wire strength members therebetween. Such a clamping arrangement is generally suitable for cables having relatively soft metallic strength members, such as copper wires, but is incapable of providing more than a hundred pounds cable retention if the strength members are formed of a relatively hard material, such as stainless steel.

Accordingly, the object of the present invention is to provide a clamp for a fiber optic cable which is capable of providing high friction retention for stainless steel wire strength members of the cable.

SUMMARY OF THE INVENTION

According to the principal aspect of the present invention, there is provided a fiber optic cable clamp assembly including inner and outer sleeves in which the strength member of the cable is folded back over the forward edge of the inner sleeve and wound in helical form around the sleeve, and thereafter the outer sleeve is crimped around the helically wound portion of the strength member and inner sleeve to tightly secure the strength member to the inner sleeve.

Because the strength member is helically wound around the inner sleeve, the surface area of the strength member which is clamped between the inner and outer sleeves is substantially increased over prior clamping arrangements. Furthermore, the increased surface area is provided in a relatively short axial length of the cable clamp assembly so that a high friction clamp may be provided for the strength members of a cable in a limited space which is critical in fiber optic connectors utilizing the clamp of the present invention.

BRIEF DESCRIPTION OF THE DRAWINGS

FIG. 4 is a perspective view of the cable clamp similar to FIG. 2 showing the strength members of the cable helically wound around the forward portion of the inner sleeve, as well as a connector support for the cable clamp shown separated from the clamp;

FIG. 5 is the longitudinal sectional view of the completed cable clamp assembly of the present invention showing the outer sleeve crimped over the helically wound strength members and inner sleeve; and FIG. 6 is a transverse sectional view showing the cable clamp seated in the support illustrated in FIG. 6.

DESCRIPTION OF THE PREFERRED EMBODIMENT

Figure 3:
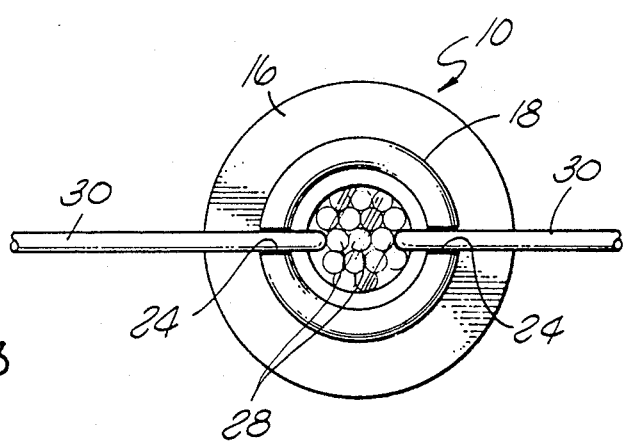
FIG. 3 is a front end view of the assembly illustrated in FIG. 2 showing the strength members of the cable extending outwardly through slots formed in the forward end of the inner sleeve.

Referring now to the drawings in detail, the inner sleeve, generally designated 10, of the cable clamp of the present invention has a forward portion 12 and a rear portion 14 separated by an outwardly extending annular flange 16 which is adapted to be mounted in a groove in a fiber optic connector body (not shown) for axially retaining the cable clamp in the connector body. A rounded annular rib 18 is formed on the forward portion 12 of the inner sleeve adjacent to its front edge 20. The rib 18 defines a rearwardly facing shoulder 22. A pair of axially extending slots 24 are formed in the forward portion of the inner sleeve. The slots open at the front edge 20 of the sleeve and preferably are diametrically opposed from each other as shown in FIG. 3. The number of slots 24 in the sleeve corresponds to the number of strength members provided in the fiber optic cable of the assembly.

Figure 1:
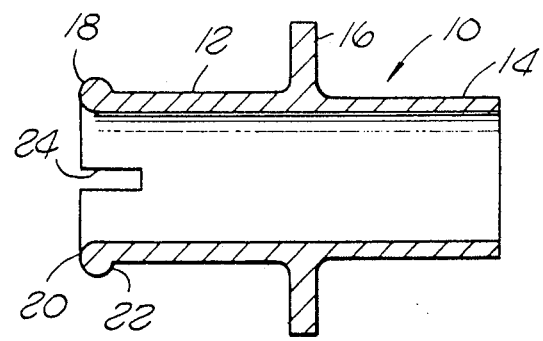
FIG. 1 is a longitudinal sectional view through the inner sleeve of the cable clamp of the present invention.
Figure 2:
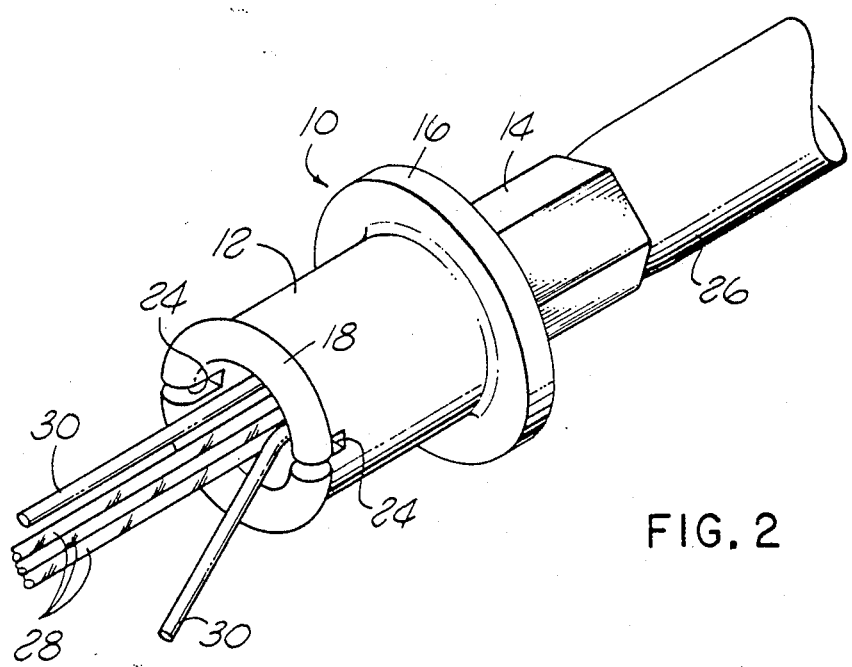
FIG. 2 is a perspective view showing a fiber optic cable extending through the rear of the inner sleeve illustrated in FIG. 1.

FIG. 2 illustrates the inner sleeve 10 mounted over a fiber optic cable 26 having a plurality of optical fibers 28 and a pair of wire strength members 30. In assembly the cable is first inserted through the rear portion of the sleeve exposing the fibers 28 and wires 30 at the front of the sleeve. The rear portion 14 of the inner sleeve is then crimped upon the outer jacket of the cable 26. The wires 30 are pulled forwardly and then bent at right angles through the slots 24 as best seen in FIG. 3. Thereafter, the wires are wound helically around the forward portion 12 of the inner sleeve as best seen in FIG. 4. An outer sleeve 32 is then slid rearwardly over the forward portion of the inner sleeve so as to surround the helically wound portions of the wires, as best seen in FIG. 5. Thereafter, the outer sleeve 32 is crimped around the helically wound wires to provide a high friction clamp for the strength members of the cable 26.

As will be appreciated, before the outer sleeve is crimped, it must have a diameter greater than that of the rounded rib 18 on the forward portion of the inner sleeve so that the outer sleeve may be freely slid onto the forward portion of the inner sleeve. However, when the outer sleeve is crimped, the cross-section thereof in the region where the dies of the crimp tool engage the sleeve is slightly less than the outer diameter of the rib 18 so that the sleeve engages the rearwardly facing shoulder 22 formed by the rib.

Initially crimping the rear portion of the inner sleeve 10 to the cable jacket is important since it allows the wires 30 to be pulled forwardly to remove all slack therein which facilitates winding of the wires around the inner sleeve and assures that the wires are under uniform tension when an axial load is applied to the cable. If one wire were to have slack therein, which can occur if the sleeve is not fixed initially to the cable, and a load is applied to the cable, the other wire would elongate which can lead to the optical fibers in the cable breaking. The present invention avoids this problem, and is applicable to clamping arrangements other than that disclosed herein.

FIGS. 4 and 6 show a support 34 for the cable clamp. The support is shown somewhat schematically and normally would form an integral part of the fiber optic connector housing in which the cable clamp and cable assembly is mounted. The crimp formed on the rear portion of the inner sleeve 10 is preferably of the form which provides flat sides 36. Adjacent sides 36 extend at angles relative to each other as best seen in FIG. 6. As shown, the crimp formed in the rear portion 14 of sleeve 10 is a hex crimp although other similar crimps could be used. The connector support 34 is formed with a recess 38 formed by three flat surfaces 40 complementary to the flat sides 36 of the crimped sleeve so that when the latter is positioned in recess 38, the flat sides 36 will bear against the flat surfaces 40 preventing rotation of the cable clamp assembly relative to the support. Preferably a second support (not shown) similar to support 34 is positioned over the top of the crimped rear portion 14 of the sleeve to prevent rotation thereof. This arrangement prevents twisting of the optical fibers which are attached to ferrules fixed in the connector housing even if the cable 26 is twisted outside of the housing. In an alternative form of the invention the sleeve 32 could be hex crimped and the forward portion of the cable clamp assembly could be mounted in the support 34. Also, the cable clamp mounting arrangement of the invention may be utilized with cable clamp assemblies of forms different than those specifically disclosed herein.

The cable clamp of the present invention has been utilized with a fiber optic cable having two stainless steel wire strength members. The clamp has withstood pull out forces of about two hundred pounds. The higher retention strength of the clamp of the present invention is due primarily to the fact that the wire strength members, being helically wound about the inner sleeve, provide a large surface area which allows high frictional forces to be achieved between the sleeves and the wires when the outer sleeve is crimped around the wires and inner sleeve. Also the retention strength is enhanced by the fact that the wires are bent at right angles through the slots 24 in the inner sleeve. The slots provide a second useful purpose in that they aid in positoning the wires so that they may be conveniently wound in helical form around the inner sleeve. If desired the slots 24 could be eliminated, in which case the wires would be bent around the front edge 20 of the inner sleeve and thereafter wound helically around the sleeve, although not as great retention strength would result.

The cable clamp of the present invention may also be utilized with cables having plastic or fibrous strength members. The strength member would be combed back over the rounded annular rib 18 of the inner sleeve and thereafter the outer sleeve would be crimped over the strength member on the inner sleeve. Accordingly, the clamp of the present invention may be utilized with fiber optic cables having either wire, plastic or fibrous strength members.

What is claimed is:

1. A fiber optic cable clamp assembly comprising:
   a fiber optic cable having a strength member and an optical fiber;
   inner and outer sleeves each having a forward end;
   said cable extending forwardly through said inner sleeve with its strength member extending around said forward end thereof and rearwardly in helical form around said inner sleeve; and
   said outer sleeve being crimped around said helically wound portion of said strength member and said inner sleeve to tightly secure said strength member to said inner sleeve.

2. A fiber optic cable clamp assembly as set forth in claim 1 wherein:
   said cable includes an outer jacket surrounding said strength member and said optical fiber; and
   said inner sleeve has a rear portion crimped onto said cable jacket.

3. A fiber optic cable clamp assembly as set forth in claim 2 including:
   a support having a recess therein formed by a plurality of flat surfaces; and
   one of said crimped elements having flat sides bearing against said flat surfaces for preventing rotation of said cable relative to said support and, thereby, avoiding twisting of the optical fiber of the cable.

4. A fiber optic cable clamp assembly as set forth in claim 1 wherein:
   said strength member is a metallic wire.

5. A fiber optic cable clamp assembly comprising:
   a fiber optic cable having a strength member and an optical fiber;
   inner and outer sleeves, said inner sleeve terminating in a front edge;
   an axially extending slot in said inner sleeve opening at said front edge;
   said cable extending forwardly through said inner sleeve with its strength member extending outwardly through said slot and rearwardly in helical form around said inner sleeve; and
   said outer sleeve being crimped around said helically wound portion of said strength member and said inner sleeve to tightly secure said strength member to said inner sleeve.

6. A fiber optic cable clamp assembly as set forth in claim 5 wherein:
   said strength member comprises a pair of metallic wires;
   said inner sleeve embodies a pair of said slots generally diametrically opposed from each other;
   said wires extending outwardly through said slots and being wound helically as a single layer around said inner sleeve; and
   said outer sleeve is crimped around said helically wound portions of said wires.

7. A fiber optic cable clamp assembly as set forth in claim 5 wherein:
   said front edge of said inner sleeve is rounded and extends outwardly to provide a rearwardly facing shoulder in front of said outer sleeve.

8. A method for clamping the strength member of a fiber optic cable comprising the steps of:
   inserting a fiber optic cable having a strength member therein into the rear end of an inner clamping sleeve;

folding an end portion of the strength member over the forward end of said sleeve and helically winding said end portion around said sleeve; and crimping an outer sleeve around said helically wound end portion of said strength member.

9. A method as set forth in claim 8 wherein:

said inner sleeve is provided with an axially extending slot opening at its forward end; and said strength member is pulled outwardly through said slot prior to winding the strength member around said inner sleeve.

10. A method as set forth in claim 8 wherein said cable has an outer jacket and including the additional step of:

crimping said inner sleeve to said jacket prior to said folding step.

11. A method for clamping the strength member of a fiber optic cable having a jacket surrounding the strength member and the optical fibers of the cable comprising the steps of:

inserting the fiber optic cable into a clamping sleeve;

crimping said clamping sleeve to the jacket of said cable;

thereafter pulling the strength member forwardly to apply tension to the strength member to remove any slack therein;

then folding an end portion of the strength member over the forward end of said sleeve while continuing to apply tension thereto; and securing said strength member to said sleeve with means surrounding said sleeve.

12. A method as set forth in claim 11 wherein:

said cable contains a plurality of strength members which are tensioned uniformly while folding the end portions thereof over the forward end of said sleeve.

13. A fiber optic connector assembly comprising:

a fiber optic cable having a strength member, at least one optical fiber and an outer jacket;

a clamp surrounding said cable and having a portion thereof crimping to said outer jacket providing a plurality of flat sides;

means connecting said strength member to said clamp;

a support for said clamp having a recess therein formed by a plurality of flat surfaces;

said flat sides of said crimped portion of said clamp bearing against said flat surfaces for preventing rotation of said cable relative to said support and, thereby, avoiding twisting of the optical fiber or fibers of said cable.

14. A connector assembly as set forth in claim 13 wherein:

said crimped portion is in the form of a hex crimp.

15. A fiber optic connector assembly comprising:

a fiber optic cable having a strength member, at least one optical fiber and an outer jacket;

a clamp surrounding said cable having a forward portion and a rear portion, said rear portion being crimped to said outer jacket;

said strength member being laid over said forward portion of said clamp;

an outer sleeve having a portion crimped around said strength member and said clamp to tightly secure said strength member to said clamp;

at least one of said crimped portions having flat sides;

a support for said clamp having a recess therein formed by a plurality of flat surfaces;

said flat sides of said one crimped portion bearing against said flat surfaces for preventing rotation of said cable relative to said support and, thereby, avoiding twisting of the optical fiber or fibers of said cable.

* * * * *